US008422671B2

(12) United States Patent
Yoon et al.

(10) Patent No.: US 8,422,671 B2
(45) Date of Patent: Apr. 16, 2013

(54) METHODS OF ENCRYPTION AND DECRYPTION USING OPERAND ORDERING AND ENCRYPTION SYSTEMS USING THE SAME

(75) Inventors: JoongChul Yoon, Seoul (KR); Seokhie Hong, Seoul (KR); Taehyun Kim, Seoul (KR); Heeseok Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 265 days.

(21) Appl. No.: 13/012,570

(22) Filed: Jan. 24, 2011

(65) Prior Publication Data

US 2011/0216900 A1    Sep. 8, 2011

(30) Foreign Application Priority Data

Mar. 8, 2010 (KR) .................. 10-2010-0020505

(51) Int. Cl.
*H04L 9/00* (2006.01)
*G06F 7/58* (2006.01)

(52) U.S. Cl.
USPC .............................. 380/28; 380/30; 708/250

(58) Field of Classification Search .................. None
See application file for complete search history.

(56) References Cited

U.S. PATENT DOCUMENTS

| 6,282,290 B1 * | 8/2001 | Powell et al. ............... 380/28 |
| 6,304,658 B1 * | 10/2001 | Kocher et al. ............... 380/30 |
| 6,970,561 B1 * | 11/2005 | Obana ........................... 380/28 |
| 2006/0227974 A1 * | 10/2006 | Haraszti ...................... 380/280 |

FOREIGN PATENT DOCUMENTS

| JP | 2006-217193 | 8/2006 |
| KR | 100402156 B1 | 10/2003 |
| KR | 1020050102291 A | 10/2005 |
| KR | 1020070001376 A | 1/2007 |
| KR | 1020070049823 A | 5/2007 |
| KR | 100772550 B1 | 10/2007 |

OTHER PUBLICATIONS

A. Daly and W. Marnane, "Efficient Architectures for implementing Montgomery Modular Multiplication and RSA Modular Exponentiation on Reconfigurable Logic", ACM, Feb. 2002, pp. 40-49.*
B. Kopf and M. Durmuth, "A Provably Secure and Efficient Countermeasure Against Timing Attacks", IEEE, 2009, pp. 324-335.*
HeeSeok Kim et al, "Practical Second-Order Correlation Power Analysis on the Message Blinding Method and Its Novel Countermeasure for RSA" ETRI Journal, vol. 32, No. 1, Feb. 2010.
K. Okeya and K. Sakurai, "A Second-Order DPA Attack Breaks a Window method based Countermeasure against Side Channel Attacks," ISC 2002, LNCS 2433, pp. 389-401, 2002.
T. Izu and T. Takagi, "A Fast Parallel Elliptic Curve Multiplication Resistant against Side Channel Attacks," Key Cryptography—PKC 2002, LNCS 2274, pp. 280-296, 2002.
F. Amiel and B. Feix, "On the BRIP Algorithms Security for RSA," WISTP 2008, LNCS 5019, pp. 136-149, Springer-Verlag, 2008.
C. Clavier and M. Joye, "Universal exponentiation algorithm—A first step towards provable SPA-resistance-," CHES2001, LNCS 2162, pp. 300-308, Springer-Verlag, 2001.
M. Ciet and M. Joye, "(Virtually) Free randomization technique for elliptic curve cryptography", ICICS 2003, LNCS, 2836, pp. 348-359, Springer-Verlag, 2003.

* cited by examiner

*Primary Examiner* — Farid Homayounmehr
*Assistant Examiner* — Henry Tsang
(74) *Attorney, Agent, or Firm* — Myers Bigel Sibley & Sajovec, P.A.

(57) ABSTRACT

Provided is a decryption method of an encryption algorithm. In the decryption method, a secret key can be received. A plurality of Montgomery multiplications can be repeated on a cipher text until a modular exponentiation of the secret key. When the repeated Montgomery multiplications are performed, an order of the plurality of Montgomery multiplications or an order of operands can be arbitrarily changed.

18 Claims, 7 Drawing Sheets

Fig. 4

| $d_i$ | r | Montgomery Ladder | New Algorithm |
|---|---|---|---|
| 0 | 0 | $U_1=Mont(U_0, U_1)$<br>$U_0=Mont(U_0, U_0)$ | $U_2=Mont(U_0, U_0)$<br>$U_1=Mont(U_1, U_0)$<br>$U_0 = U_2$ |
| 0 | 1 | | $U_2=Mont(U_0, U_1)$<br>$U_0=Mont(U_0, U_0)$<br>$U_1 = U_2$ |
| 1 | 0 | $U_0=Mont(U_0, U_1)$<br>$U_1=Mont(U_1, U_1)$ | $U_2=Mont(U_1, U_0)$<br>$U_1=Mont(U_1, U_1)$<br>$U_0 = U_2$ |
| 1 | 1 | | $U_2=Mont(U_1, U_1)$<br>$U_0=Mont(U_0, U_1)$<br>$U_1 = U_2$ |

METHODS OF ENCRYPTION AND DECRYPTION USING OPERAND ORDERING AND ENCRYPTION SYSTEMS USING THE SAME

CROSS-REFERENCE TO RELATED APPLICATIONS

This U.S. non-provisional patent application claims priority under 35 U.S.C. §119 of Korean Patent Application No. 10-2010-0020505, filed on Mar. 8, 2010, the entire contents of which are hereby incorporated herein by reference.

BACKGROUND

The present disclosure herein relates to a decryption method of an encryption algorithm and an encryption system using the same.

Generally, basic functions of cryptographic technologies may be classified into confidentiality functions (referred to as 'encryption technology') and certification technologies (referred to as 'fundamental cryptographic protocol technology').

The confidentiality function, which is a function of preventing illegal exposure of important data transmitted on information communication network, refers to technology or science that treats principles, means, and methods for transforming messages into indecipherable forms by a third party or converting encrypted messages into decipherable forms.

Normal messages that a transmitter intends to send to a receiver are called plaintexts, and a process of converting plaintexts into ciphertexts that a third party cannot understand is called encryption. On the contrary, a process of recovering ciphertexts to original plaintexts is called decryption. Decryption refers to a case where a legitimate receiver recovers ciphertexts to plaintexts through just procedures, and cryptanalysis refers to a case where an illegitimate third party (e.g., wiretapper) pries plaintexts through other means.

Also, encryption/decryption manners refer to encryption/decryption algorithms, and parameters for controlling conversion of plaintext/ciphertext by the encryption/decryption algorithms refer to encryption/decryption keys. The encryption/decryption algorithms are divided into symmetric key encryption algorithms and public key (asymmetric) encryption algorithms. Data Encryption Standard (DES), U.S. Standard, and SEED, Korean Standard, are representative examples of symmetric key encryption algorithms, and RSA is a representative public key algorithm.

SUMMARY

The present disclosure provides a decryption method of an encryption algorithm and an encryption system using the same, which are safe in a differential power analysis.

Embodiments of the inventive concept provide decryption methods of an encryption algorithm including: receiving a secret key; and repeating a plurality of Montgomery multiplications on a cipher text until a modular exponentiation of the secret key, wherein, when the repeated Montgomery multiplications are performed, an order of the plurality of Montgomery multiplications or an order of operands is arbitrarily changed.

In some embodiments, the method may further include: blinding the ciphertext after the secret key is received; and removing the blinding from a final value after the repeated Montgomery multiplications are performed.

In other embodiments, the method may further include: multiplying the ciphertext by a random number for the blinding of the ciphertext; and multiplying the final value by an inverse element of the random number for the removing of the blinding.

In still other embodiments, the plurality of Montgomery multiplications may include: a first Montgomery multiplication on a square of one of a first operand and a second operand according to a binary value bit of the secret key; and a second Montgomery multiplication on a product of the first operand and the second operand according to the other binary value bit of the secret key.

In even other embodiments, before the plurality of Montgomery multiplications are performed, a random bit may be generated to arbitrarily change the order of the first and second Montgomery multiplications or the order of the first and second operands.

In yet other embodiments, before the plurality of Montgomery multiplications are performed, the order of the first and second Montgomery multiplications may be determined according to the generated random bit, and the order of the first and second operands may be determined the generated random bit.

In further embodiments, the first Montgomery multiplication may include a Montgomery multiplication of an operand corresponding to the binary value bit of the secret key and an operand corresponding to the generated random bit.

In still further embodiments, the second Montgomery multiplication may include a Montgomery multiplication of an operand corresponding to a bit opposite to the generated random bit and an operand corresponding to the other binary value bit of the secret key.

In even further embodiments, the first Montgomery multiplication may produce a result value that becomes an operand corresponding to the random bit.

In yet further embodiments, when the ciphertext is 1 or −1, a certain value may become an output value of the encryption algorithm.

In other embodiments of the inventive concept, encryption systems include: an encryption unit encrypting a plaintext using an encryption key according to an encryption algorithm; and a decryption unit decrypting a ciphertext using a decryption key according to the encryption algorithm, wherein the encryption algorithm repeats a plurality of Montgomery multiplications using first and second operands according to a binary bit of the encryption key on the ciphertext until a modular exponentiation of the encryption key, or repeats a plurality of Montgomery multiplications using the first and second operands according to a binary bit of the decryption key on the plaintext until a modular exponentiation of the decryption key, and an order of the Montgomery multiplications or an order of the first and second operands is arbitrarily changed.

In still other embodiments of the inventive concept, decryption units include: a shift register receiving a secret key comprising a plurality of binary value bits and sequentially outputting the plurality of the binary value bits of the secret key; a random generator generating a first random number for blinding and a second random number for arbitrarily changing an order of Montgomery multiplications and an order of operands; an exponentiation operator performing a modular exponentiation of the first random number on a first fixed value and a second fixed value that are inputted to blind a ciphertext, respectively, the second fixed value being an inverse element of 2m modular exponentiated value of the first fixed value; a first operand register storing a first operand, the first operand having an initial value being a result value of a Montgomery multiplication of the first fixed value and a square of a radix; a second operand register storing a second operand, the second operand having an initial value being a result value of a Montgomery multiplication of the initial value of the first operand and a result value of Montgomery multiplication of the ciphertext and the square of the radix; a third operand register storing the second fixed value for removing the blinding of the ciphertext; and a Montgomery multiplier performing a plurality of Montgomery multiplications using the first and second operands according to a binary value bit outputted from the shift register, the first and second operands being changed upon the plurality of Montgomery multiplications, and the order of the Montgomery multiplications or the order of the first and second operands being changed according to the second random number when the Montgomery multiplications are performed.

In some embodiments, the decryption unit may further include a message checker generating a certain value as an output value of the decryption unit when the ciphertext is 1 or −1.

In other embodiments, the message checker may output 1 when the ciphertext is 1, and may output a value obtained by subtracting two times of a least significant bit of the secret key from 1 when the ciphertext is −1.

In still other embodiments, the decryption unit may further include a non-volatile memory device storing the first and second fixed values.

In even other embodiments, the Montgomery multiplier may perform a first Montgomery multiplication on a square of one of the first operand and the second operand according to a binary value bit of the secret key, regarding each of the plurality of the binary value bits of the secret key, and a second Montgomery multiplication on a product of the first operand and the second operand according to the other binary bit of the secret key, and a result value of the first Montgomery multiplication may become an operand corresponding to the random bit.

In yet other embodiments, the Montgomery multiplier may generate the output value of the decryption unit, by performing a Montgomery multiplication on a finally stored value in the first operand register and the second fixed value stored in the third operand register.

In further embodiments, the first random number may include a plurality of binary value bits.

In still further embodiments, the number of the binary value bits of the secret key may be a size of a modulus.

In even further embodiments, the modulus may be a product of different prime number having sizes similar to each other.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 4 is a diagram illustrating a comparison between a General Montgomery ladder algorithm and an encryption algorithm according to an embodiment of the inventive concept;

DETAILED DESCRIPTION OF THE EMBODIMENTS

Figure 1:
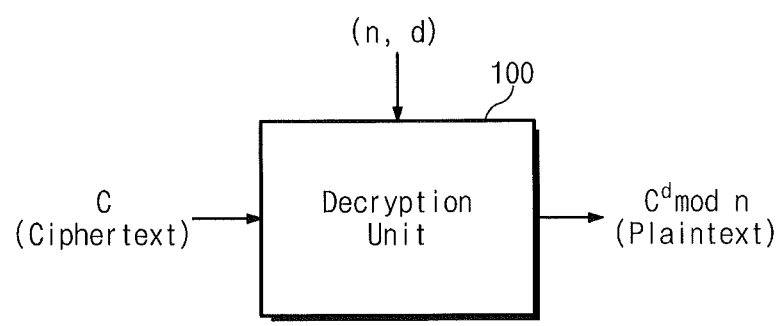
FIG. 1 is a diagram illustrating a decryption unit according to an embodiment of the inventive concept.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Hereinafter, exemplary embodiments of the inventive concept will be described in detail with reference to the accompanying drawings. Encryption and decryption systems are also described in "Practical Second-Order Correlation Power Analysis on the Message Blinding Method and Its Novel Countermeasure for RSA," by Kim et al., published in Electronics and Telecommunications Research Institute (ETRI) Journal, Volume 32, Number 1, February 2010, which is incorporated herein by reference in its entirety.

FIG. 1 is a diagram illustrating a decryption unit 100 according to an embodiment of the inventive concept. Referring to FIG. 1, the decryption unit 100 may decrypt a ciphertext C into a plaintext $C^d$ mod n, by performing a modular exponentiation according to an encryption algorithm using a key pair (n, d), where n is a modulus, and d is a secret key (or decryption key). Herein, the modulus n is the product of different prime numbers.

The secret key modular exponentiation $C^d$ mod n of the ciphertext C according to the embodiment of the inventive concept may be obtained by performing repeated modular multiplications. Herein, the plurality of modular multiplications may include squaring of an operand or multiplication of different operands according to a binary value bit (e.g. '0' or '1') of a secret key d.

The decryption unit 100 according to the embodiment of the inventive concept may arbitrarily change an order of modular multiplications or an order of operands when the repeated modular multiplications are performed.

When a general decryption unit performs modular multiplications, at least one of operands is fixed. Thus, there is a great possibility that a secret key or a portion of information on the secret key may be exposed.

On the other hand, the decryption unit 100 according to the embodiment of the inventive concept may arbitrarily change an order of modular multiplications or an order of operands when modular multiplications are performed. Thus, the decryption unit 100 may not expose the secret key or a portion of information on the secret key upon differential power analysis.

For convenience of explanation, a Montgomery modular multiplication will be referred to as a modular multiplication. The Montgomery modular multiplication may be simply implemented in hardware and be faster in operation speed, by substituting a subtraction operation with a shift operation. However, the modular multiplication according to the embodiment of the inventive concept is not limited to the Montgomery multiplication.

Figure 2:
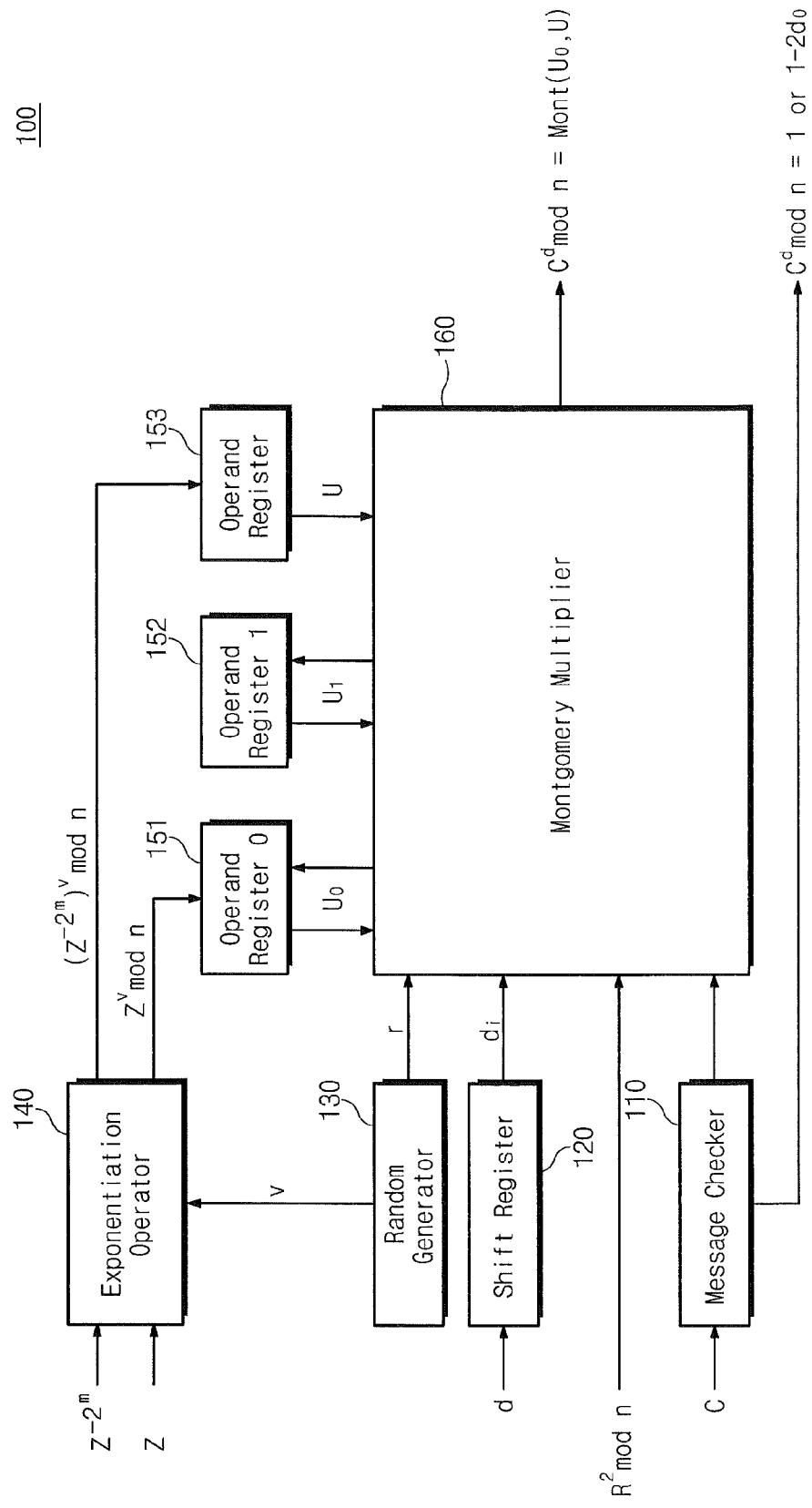
FIG. 2 is a diagram illustrating the decryption unit of FIG. 1 according to an embodiment of the inventive concept.

FIG. 2 is a diagram illustrating the decryption unit 100 of FIG. 1 according to an embodiment of the inventive concept. Referring to FIG. 2, the decryption unit 100 may include a message checker 110, a shift register 120, a random generator 130, an exponentiation operator 140, first to third operand registers 151 to 153, and a Montgomery multiplier 160.

The message checker 110 may prevent a Yen's attack. Herein, the Yen's attack may obtain information related to a modulus n by inputting 1 or −1 into a ciphertext C. The message checker 110 may output a certain value as a result value of the decryption unit 100 when 1 or −1 is inputted into the ciphertext C. For example, the message checker 110 may output 1 when the ciphertext is 1, and may output $1-2_0$ when the ciphertext is −1. Herein, $d_0$ is the least significant bit of the secret key d, and the secret key d is m binary values. Herein, m is the size of the modulus n.

The shift register 120 may receive the secret d including m bits to output one by one when the Montgomery multiplications are performed. Herein, the output value $d_i$ (e.g. '0' or '1') of the shift register 120 denotes an i-th bit of the secret d.

The random generator 130 may generate a first random number v used in an operand initialization operation and a second random number r used in a Montgomery multiplication. The first and second random numbers v and r may be 1 (integer greater than 1)-bit. Herein, the first random number v may be used for a message blinding, and the second random number r may be used to arbitrarily change the order of the Montgomery multiplications and the order of the operands.

The exponentiation operator 140 may perform exponentiations as many as the first random number v on random numbers z, Herein, the output values $z^v$ mod n, $(z^{-2^m})^v$ mod n of the exponentiation operator 140 may be inputted into the first operand register 151 and the third operand register 153, respectively. In other words, the output values $z^v$ mod n, $(z^{-2^m})^v$ mod n of the exponentiation operator 140 may be initial values of the first operand register 151 and the third operand register 153, respectively.

In the present embodiment of the inventive concept, in order to generate random numbers for message blinding of the ciphertext C, an exponentiation may be performed as many as one of the random numbers v on the random number z. Herein, the message blinding of the ciphertext C may protect the cipher text C from a simple power analysis. That is, the output value ($z^v$ mod n) of the exponentiation operator 140 may be random numbers for the message blinding of the ciphertext C. This is for reducing cost to generate an inverse element $(z^v)^{-1}$.

The first and third operand registers 151 to 153 may store first and third operand values $U_0$, $U_1$ and U for performing the Montgomery multiplications.

The Montgomery multiplier 160 may perform Montgomery multiplications using the first and second operand values $U_0$ and $U_1$ by encryption algorithm. The Montgomery multiplication is expressed as Equation (1).

$$Mont(A,B)=A \times B \times R^{-1} \qquad (1)$$

where A, which is a multiplicand, is an integer satisfying $0 \leq A < n$, B, which is a multiplier, is an integer satisfying $0 \leq B < n$, and R, which is a radix, is $2^m$.

Herein, m is the size of the modulus n. The radix R need not be 2m. The radix R and n are relatively prime, and the radix R is an integer greater than n.

The Montgomery multiplier 160 may process modular operations on random numbers difficult to implement in hardware, simply using multiplication, addition, and shift operations. Thus, the Montgomery multiplier 160 may be advantageous to implement in hardware or software.

The Montgomery multiplier 160 may not fix the order of the first and second operands $U_0$ and $U_1$. The Montgomery multiplier 160 may perform the Montgomery multiplications according to an encryption algorithm that arbitrarily changes the order of Montgomery multiplications and the order of the operands $U_0$ and $U_1$, using the second random number r.

The Montgomery multiplier 160 may finally output a Montgomery multiplication value Mont($U_0$, U) of the first operand $U_0$ and the third operand U. In other words, the Montgomery multiplier 160 may remove blinding by performing a Montgomery multiplication of the third operand U with respect to the final value of the first operand $U_0$. Herein, the blinding of the ciphertext and then removing of the blinding refer to mapping of the ciphertext and then the remapping.

The decryption unit 100 according to the embodiment of the inventive concept may perform a modular multiplication according to an encryption algorithm that arbitrarily changes the order of the Montgomery multiplications and the order of the operands $U_0$ and $U_1$, using the random number r. Thus, the secret key may not be easily exposed upon differential analysis attack.

Figure 3:
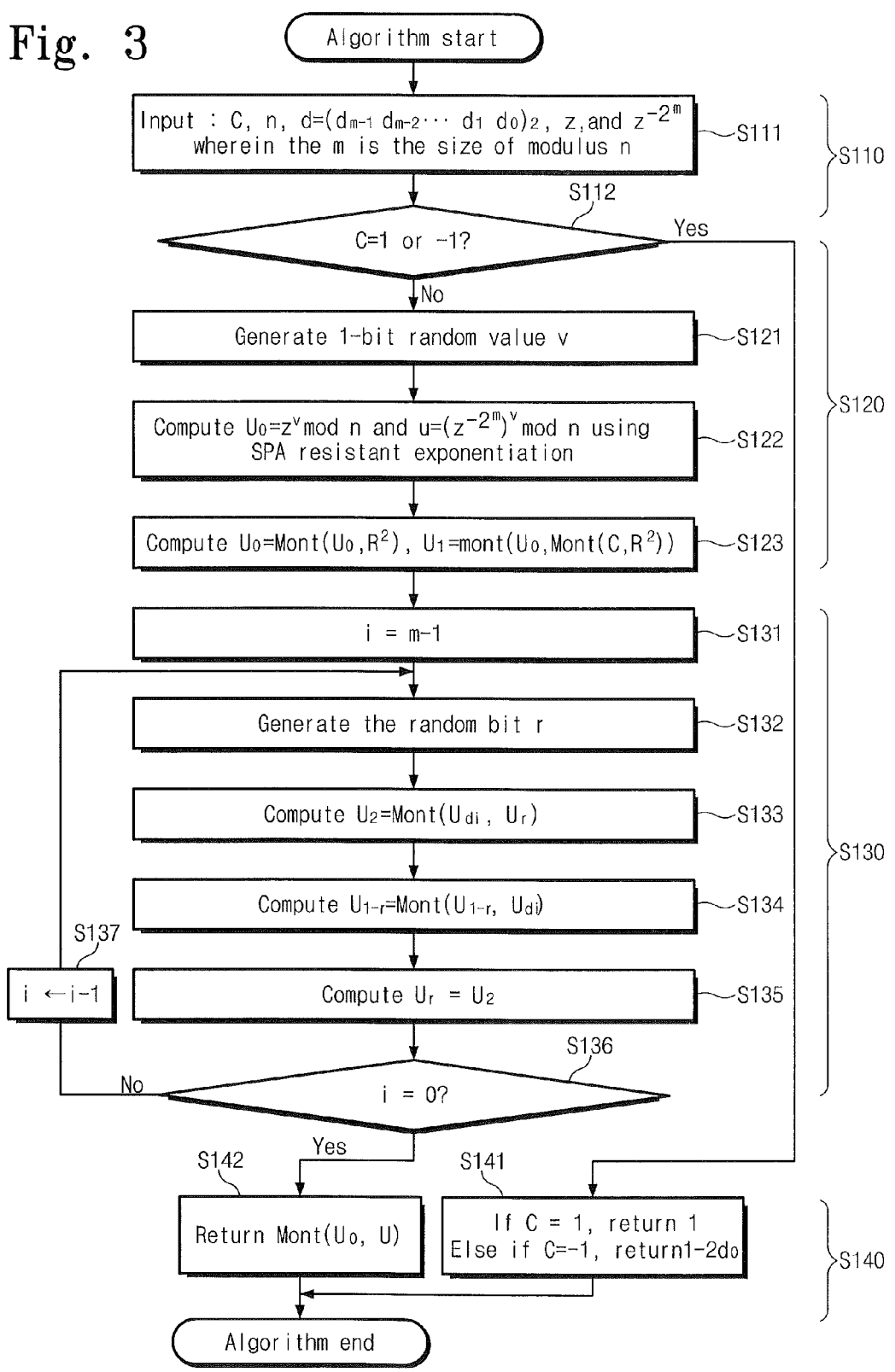
FIG. 3 is a flowchart illustrating an encryption algorithm according to an embodiment of the inventive concept.

FIG. 3 is a flowchart illustrating an encryption algorithm according to an embodiment of the inventive concept. Referring to FIGS. 2 and 3, the encryption algorithm according to the embodiment of the inventive concept may progress as follows. The encryption algorithm according to the embodiment of the inventive concept may include message check operation S110, operand initialization operation S120, Montgomery multiplication operation S130, and output operation S140.

In operation S111, the decryption unit 100 may receive input values C, n, d, $z, z^{-2^m}$ used for operation. Herein, the secret key d may include m binary values $(d_{m-1}d_{m-2} \cdots d_1d_0)_2$, and m is the size of the modulus n.

Herein, the input values $z, z^{-2^m}$, which are numbers used for message blinding, are value inputted from a nonvolatile memory (not shown). The input values $z, z^{-2^m}$ may be stored in the nonvolatile memory. Herein, the nonvolatile memory may include ROM, PRAM, NAND flash memory, and NOR flash memory. The input values $z, z^{-2^m}$ need not be stored in a nonvolatile memory. The input values $z, z^{-2^m}$ may be generated from the random generator 130.

In operation S112, the message checker 110 may determine whether an inputted ciphertext C is 1 or −1. In operation S141, the message checker 110 may output 1 as an output value of an encryption unit if the ciphertext C is 1, and the message checker 110 may output $1-2d_0$ as the output value of the encryption unit if the ciphertext C is −1, On the other hand, if the inputted ciphertext C is neither 1 nor −1, operand initialization may be performed in operation S120.

In operation S121, the random generator 130 may generate 1-bit of a first random number v for the operand initialization.

In operation S122, the exponentiation operator 140 may perform exponentiations as many as the first random number v on inputted random numbers $(z, z^{-2^m})$. In this case, exponentiated values $z^v \bmod n$ and $(z^{-2^m})^v \bmod n$ may be stored in the first operand register 151 and the third operand register 153, respectively. That is, the exponentiated values $z^v \bmod n$ and $(z^{-2^m})^v \bmod n$ may be initial values of the first operand $U_0$ and the third operand U, respectively.

In operation S123, the Montgomery multiplier 160 may compute an initial value of the second operand $U_1$ using the initial value of the first operand $U_0$. The Montgomery multiplier 160 may compute a new first operand U0 through a Montgomery multiplication with respect to the initial value of the first operand U0 and the square $R^2$ of the radix. Herein, the square $R^2$ of the radix may be inputted from a non-volatile memory. In this case, the new first operand U0 is expressed as Equation (2)

$$U_0 = \text{Mont}(U_0, R^2) \quad (2)$$

The Montgomery multiplier 160 may perform a Montgomery multiplication with respect to the ciphertext C and the square $R^2$ of the radix. Thereafter, the Montgomery multiplication 160 may perform a Montgomery multiplication with respect to the computed new first operand $U_0$ and the operated value Mont(C, $R^2$). Then, a resulting value may be stored in the second operand register 152 as an initial value of the second operand $U_1$. Herein, the initial value of the second operand $U_1$ stored in the second operand register 152 is expressed as Equation (3).

$$U_1 = \text{Mont}(U_0, \text{Mont}(C, R^2)) \quad (3)$$

Thus, the initial values of the operands $U_0$, $U_1$ and U may be set, and repeated Montgomery multiplications may be performed in operation S130. Herein, the Montgomery multiplications may include the square of an operand and the product of different operands.

In operation S131, the shift register 120 may output an i-th bit $d_i$ to the Montgomery multiplier.

In operation S132, the random generator 150 may generate a second random number r to be used in a Montgomery multiplication. Herein, the second random number r may be 0 or 1.

In operation 133, the Montgomery multiplication 160 may compute a temporary operand $U_2$ by performing a Montgomery multiplication with respect to an operand $U_{di}$ and an operand $U_r$. Herein, the operand $U_{di}$ may be one of the first operand $U_0$ and the second operand $U_1$, and the operand $U_r$ may be one of the first operand $U_0$ and the second operand $U_1$.

In operation 134, the Montgomery multiplication 160 may perform a Montgomery multiplication with respect to an operand $U_{1-r}$, and an operand $U_{di}$. Herein, the operand $U_{1-r}$, may be one of the first operand $U_0$ and the second operand $U_1$, and the operand $U_{di}$ may be one of the first operand $U_0$ and the second operand $U_1$.

In operation S135, the Montgomery multiplier 160 may compute the temporary operand $U_2$ as the operand $U_r$.

In operation S136, the Montgomery multiplier 160 may determine whether i is 0.

If i is not 0, a new i is obtained by subtracting 1 from i. The shift register 120 may output a new i-th secret key di to the Montgomery multiplier 160 in operation S131. Thereafter, the procedure proceeds to S132.

On the other hand, if i is 0, the Montgomery multiplier 160 may output a result value Mont($U_0$, U) of the decryption unit 100 by performing a Montgomery multiplication with respect to the first operand U0 and the third operand in operation S142. This is a process for removing a message-blinded value.

In this case, the first operand register 151 may store a value that satisfies Equation (4) below.

$$U_0 = C^d(z^v)^{2^m} R \bmod n \quad (4)$$

Accordingly, the result value Mont($U_0$, U) of the decryption unit 100 is expressed as Equation (5).

$$\text{Mont}(U_0, U) = C^d(z^v)^{2^m} R(z^{-2^m})^v R^{-1} \bmod n = C^d \bmod n \quad (5)$$

The encryption algorithm according to the embodiments of inventive concept may determine the order of the Montgomery multiplications according to the random number r. That is, it is determined according to the random number r whether the square of the first or second operand should be first performed or the product of the first operand and the second operand should be first performed.

Also, the encryption algorithm may determine the order of the operands $U_0$ and $U_1$ when the square of the first or second operand is performed or the product of the first operand and the second operand is performed according to the random number r. That is, the order of the operands $U_0$ and $U_1$ may be determined when the Montgomery multiplications are performed according to the random number r.

In brief, the encryption algorithm according to the embodiments of the inventive concept may arbitrarily change the order of the Montgomery multiplications or the order of the operands according to the random number r. Thus, the encryption algorithm may not expose the secret key d upon differential power analysis.

FIG. 4 is a diagram illustrating a comparison between a General Montgomery ladder algorithm and an encryption algorithm according to an embodiment of the inventive concept.

The General Montgomery ladder algorithm may perform Montgomery multiplications on the bit $d_i$ of the secret key d, which satisfy Equation (6) below.

$$U_{1-di} = \text{Mont}(U_0, U_1), U_{di} = \text{Mont}(U_{di}, U_{di}) \qquad (6)$$

When the bit $d_i$ of the secret key d is 0, $U_0 = \text{Mont}(U_0, U_0)$, and $U_1 = \text{Mont}(U_0, U_1)$. In this case, the first operands of two Montgomery multiplications have the same value $U_0$.

When the bit $d_i$ of the secret key d is 1, $U_0 = \text{Mont}(U_0, U_0)$, and $U_1 = \text{Mont}(U_1, U_1)$. In this case, the second operands of two Montgomery multiplications have the same value $U_1$.

As described above, the General Montgomery ladder algorithm may be vulnerable to a differential power analysis as the position of a fixed operand varies according to the bit $d_i$ of the secret key d.

On the other hand, the encryption algorithm according to the embodiment of the inventive concept may perform operations on the bit $d_i$ of the secret key d, which satisfy Equation (7) below.

$$U_2 = \text{Mont}(U_{di}, U_r) U_{1-r} = \text{Mont}(U_{1-r}, U_{dl}), U_r = U_2 \qquad (7)$$

where r, which is a random number, is 0 or 1.

When the bit $d_i$ of the secret key d is 0, and the random number r is 0, $U_2 = \text{Mont}(U_0, U_0)$, $U_1 = \text{Mont}(U_1, U_0)$, and $U_0 = U_2$. On the other hand, when the bit $d_i$ of the secret key d is 0, and the random number r is 1, $U_2 = \text{Mont}(U_0, U_1)$, $U_1 = \text{Mont}(U_0, U_0)$, and $U_1 = U_2$. Accordingly, the operands of the Montgomery multiplication are not fixed according to the bit $d_i$ of the secret key d.

When the bit $d_i$ of the secret key d is 1, and the random number r is 0, $U_2 = \text{Mont}(U_1, U_0)$, $U_1 = \text{Mont}(U_1, U_1)$, and $U_0 = U_2$. On the other hand, when the bit $d_i$ of the secret key d is 1, and the random number r is 1, $U_2 = \text{Mont}(U_1, U_1)$, $U_1 = \text{Mont}(U_0, U_1)$, and $U_1 = U_2$. Accordingly, the operands of the Montgomery multiplication are not fixed according to the bit $d_i$ of the secret key d.

In brief, the order of operands in the General Montgomery ladder algorithm may be fixed according to the bit $d_i$ of the secret key d. On the other hand, the order of operands in the algorithm according to the embodiment of the inventive concept may not be fixed according to the bit $d_i$ of the secret key d.

The algorithm according to the embodiment of the inventive concept may not easily expose the secret key even upon differential power analysis, by arbitrarily changing the order of Montgomery multiplications and the order of operands.

Figure 5:
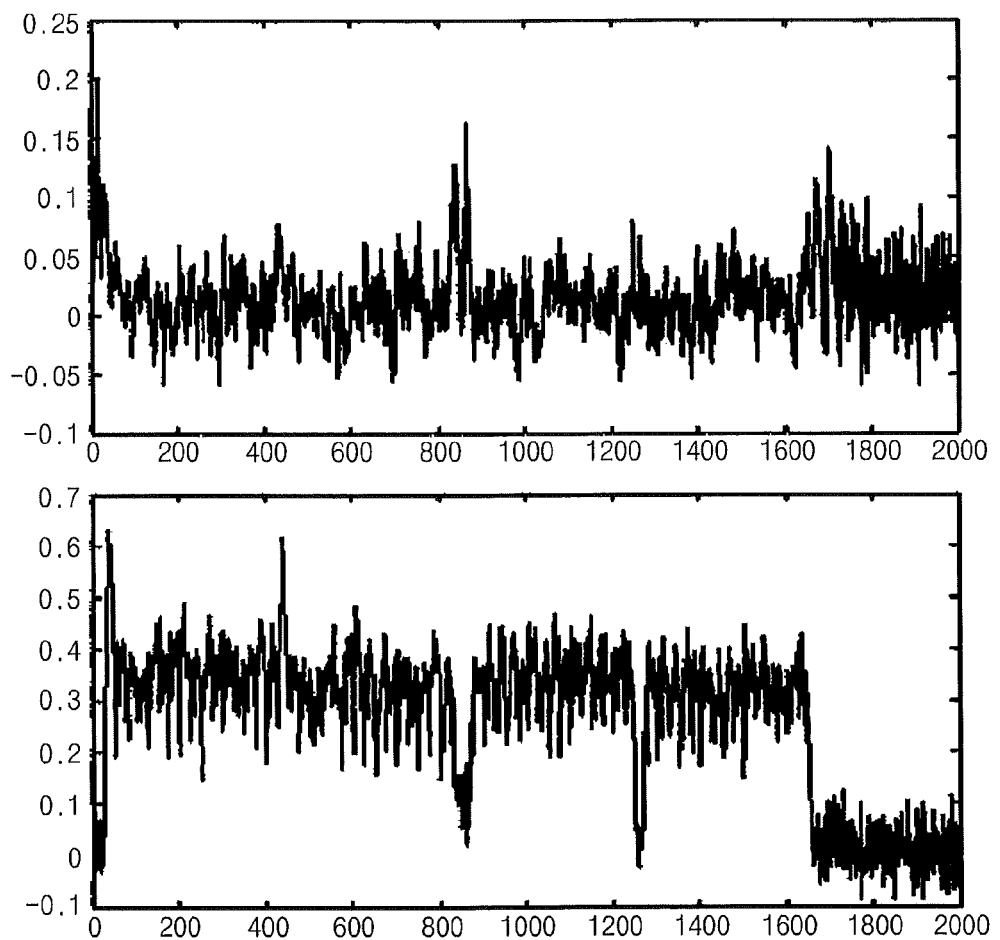
FIG. 5 is a diagram illustrating a waveform obtaining a correlation coefficient between two Montgomery multiplications according to bits when a General Montgomery ladder algorithm is used.

FIG. 5 is a diagram illustrating a waveform obtaining a correlation coefficient between two Montgomery multiplications according to bits when a General Montgomery ladder algorithm is used. The upper end represents a correlation coefficient when the bit $d_i$ is 0, and the lower end represents a correlation coefficient when the bit $d_i$ is 1. Referring to FIG. 5, a difference between waveforms is clear according to the bit $d_i$. Thus, it can be verified that the bit $d_i$ of the secret key d is easily exposed.

Figure 6:
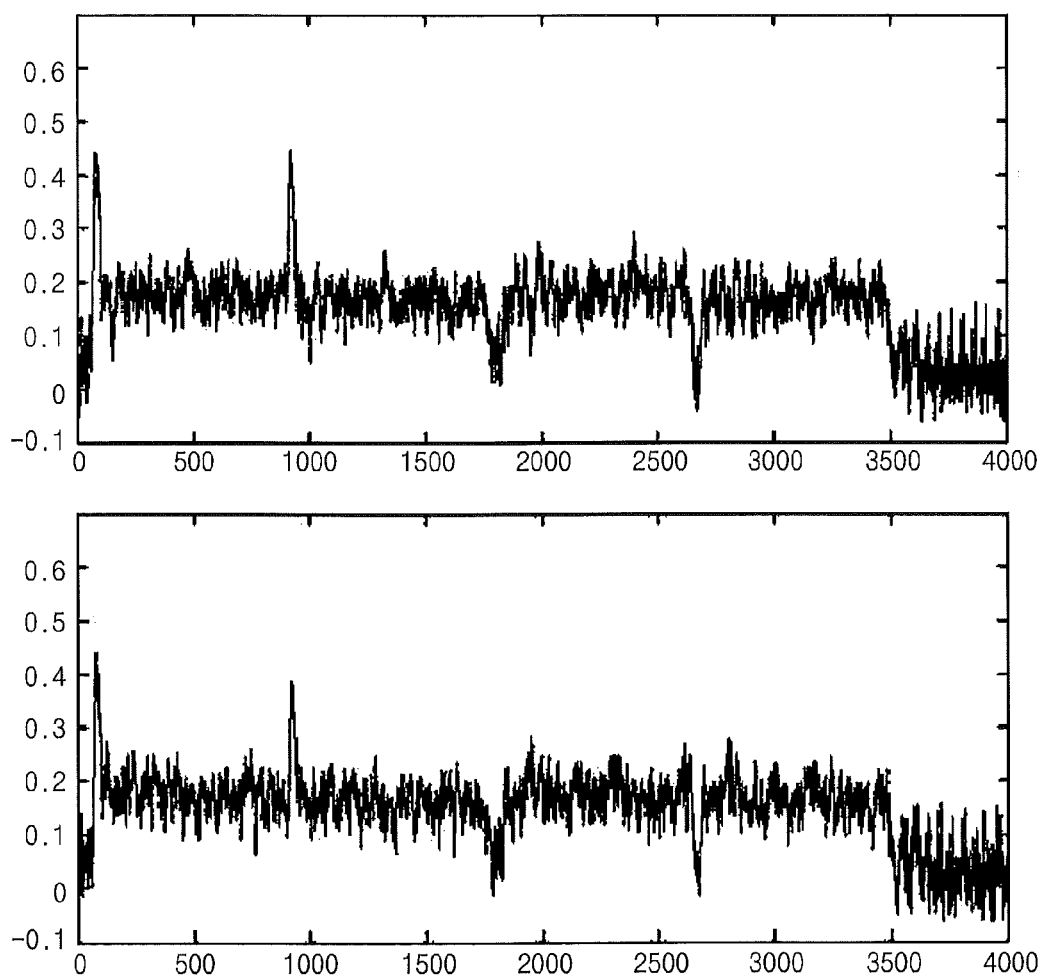
FIG. 6 is a diagram illustrating a waveform obtaining a correlation coefficient between two Montgomery multiplications according to bits when an encryption algorithm according to an embodiment of the inventive concept is used.

FIG. 6 is a diagram illustrating a waveform obtaining a correlation coefficient between two Montgomery multiplications according to bits when an encryption algorithm according to an embodiment of the inventive concept is used. The upper end represents a correlation coefficient when the bit $d_i$ is 0, and the lower end represents a correlation coefficient when the bit $d_i$ is 1. Referring to FIG. 6, a difference between waveforms is unclear according to the bit $d_i$. Thus, it may be verified that the bit $d_i$ of the secret key d is not easily exposed.

The decryption unit 100 has been described in FIGS. 1 through 6. However, the encryption algorithm according to the embodiment of the inventive concept need not be necessarily applied only to the decryption unit 100. For example, the encryption algorithm may be equally applied to the encryption unit.

Figure 7:
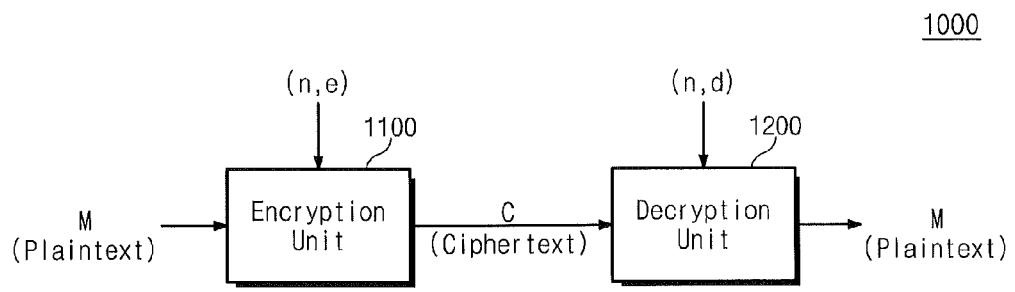
FIG. 7 is a diagram illustrating an encryption system applied with an encryption algorithm according to an embodiment of the inventive concept.

FIG. 7 is a diagram illustrating an encryption system 1000 applied with an encryption algorithm according to an embodiment of the inventive concept. Referring to FIG. 7, the encryption system 1000 may include an encryption unit 1100 and a decryption unit 1200.

The encryption system 1000 may be a Rivest, Shamir, and Adleman (RSA) system.

A modulus n may be determined by the product (pq) of different prime numbers (p and q) having sizes similar to each other. A public key, which is an integer that is relatively prime with $\Phi(n) = (p-1) \times (q-1)$, may satisfy $1 < e < \Phi(n)$. Herein, $\Phi(n)$ is a function indicating the number of positive integers that are smaller than n and are relatively prime with n. The private key d is $e^{-1} \mod \Phi(n)$. Herein, the public key e and the private key d may be secret keys, and satisfy Equation (8) below. Generally the public key e is referred to as an encryption key, and the private key d is referred to as a decryption key.

$$ed = 1 \mod \Phi(n) \qquad (8)$$

For example, when a prime number p is 17, and a prime number q is 11, the modulus n may be 187, and $\Phi(n)$ is 160. Accordingly, the public key e and 160 are relatively prime, and the public key e is an integer smaller than 160. For example, let us assume the public key e is 7. In this case, the private key d is 23 because de=1 mod 160, and d is an integer smaller than 160.

The encryption unit 1100 may receive a first key pair (n, e), and encrypt a plaintext M into a ciphertext C according to the encryption algorithm. The encryption unit 1100 may be implemented identically to the decryption unit 100 shown in FIG. 2. In this case, the ciphertext C is expressed as Equation 9.

$$C = M^e \mod n \qquad (9)$$

The decryption unit 1200 may receive a second key pair (n, d), and decrypt a ciphertext C into a plaintext M according to the encryption algorithm. The decryption unit 1200 may be implemented identically to the decryption unit 100 shown in FIG. 2. In this case, the plaintext M is expressed as Equation 9.

$$M = C^d \mod n = (M^e \mod n)^d \mod = M^{ed} \mod n \qquad (10)$$

where the product of the public key e and the private key d is $1 \mod \Phi(n)$.

The encryption system 1000 according to the embodiment of the inventive concept may prevent exposure of a secret key from a different power analysis attack, by including an encryption unit 1100 and a decryption unit 1200, which have an encryption algorithm that arbitrarily changes operands according to bits of the secret key upon Montgomery multiplication.

Figure 8:
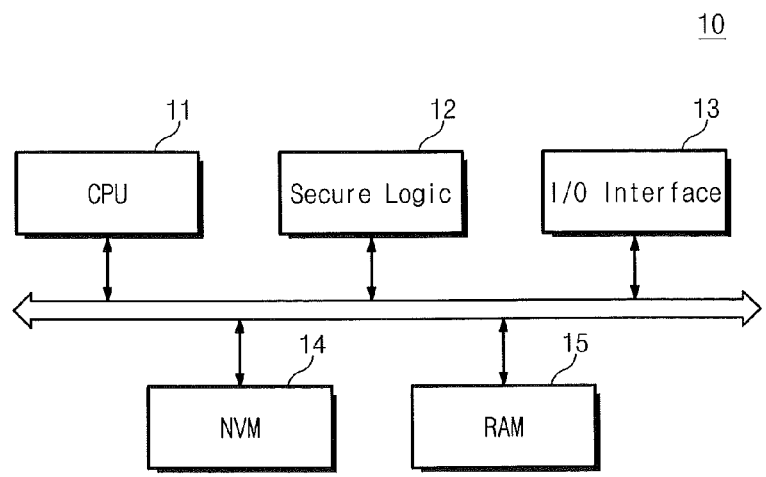
FIG. 8 is a diagram illustrating a smart card having a security logic according to an embodiment of the inventive concept.

FIG. 8 is a diagram illustrating a smart card 10 having a security logic according to an embodiment of the inventive concept. Referring to FIG. 8, the smart card 10 may include a Central Processing Unit (CPU) 11, a security logic 12, an input/output (I/O) interface 13, a non-volatile memory 14, and a Random Access Memory (RAM) 15.

The CPU 11 may control overall operation of the smart card 10.

The security logic 12 may change a plaintext or a ciphertext into a ciphertext or a plaintext. The security logic 12 may be implemented according to the encryption algorithm described in FIGS. 2 and 3, The security logic 12 may include the encryption system 1000 shown in FIG. 7.

As shown in FIG. 8, the security logic 12 is provided at the outside of the CPU 11, but embodiments of the inventive concept are not limited thereto. The security logic 12 may be provided in the CPU 11.

The I/O interface 13 may interface I/O of commands, addresses, and data between the smart card 10 and the external devices.

The non-volatile memory device 14, which is a program memory, may store card operating systems and basic commands, The non-volatile memory 14 may be ROM, NAND flash, NOR flash, PRAM, etc. The non-volatile memory device 14 may store data used for driving of the security logic 12.

The RAM 15 may store temporary data and intermediate calculation value that are generated during the operation of the smart card 10.

General power analysis measures are vulnerable to a secondary differential power analysis. However, embodiments of inventive concept disclose a new countermeasure that utilizes a Montgomery ladder technique to confront a secondary differential power analysis.

An encryption algorithm according to an embodiment of the inventive concept may provide stability against a secondary differential power analysis while the amount of operation is the same as that of a General BRIP algorithm vulnerable to the secondary differential power analysis.

Also, an encryption algorithm according to an embodiment of the inventive concept has efficiency higher than that of a General encryption algorithm by using randomization of exponent.

In addition, an encryption algorithm according to an embodiment of the inventive concept may perform more efficient operations than a General encryption algorithm.

A decryption unit and encryption algorithm thereof according to an embodiment of the inventive concept are safe from a differential analysis attack, by arbitrarily changing an order of operand and an order of multiplication upon.

The BRIP algorithm to prevent SPA, DPA, and RPA may be broken by power attacks, since the BRIP algorithm manipulates the same operand when each bit of the secret key is equal. Most of the left-to-right type exponentiation algorithms have this kind of weakness. Therefore, the present invention proposes a secure and efficient countermeasure based on the ML technique which aims at removing the dependency between the key bit and processed operand. The exponentiation algorithm against SODPA according to the an embodiment of the inventive concept is as follows:

Input: $X$, $m$, $d=(d_{n-1}d_{n-2}\ldots d_1d_0)_2$, $z$ and $z^{-2^n}$, wherein n is the size of modulus m.
Output: $X^d \bmod m$.
1. If $X=1$ then return 1. Else if $X=-1$ then return $1-2d_0$.
2. Generate a random value v.
3. Compute $U0=z^v \bmod m$ and $U=z^{-2^n})v \bmod m$ using SPA resistant exponentiation.
4. Compute $U_0=\mathrm{Mont}(U_0, R^2)$, $U_1=\mathrm{Mont}(U_0,\mathrm{Mont}(X, R^2))$.
5. For i=n−1 down to 0 do
5.1. Generate the random bit r.
5.2. $U_2=\mathrm{Mont}(U_{di}, U_r)$.
5.3. $U_{1-r}=\mathrm{Mont}(U_{1-r}, U_{di})$.
5.4. $U_r=U_2$.
6. Return $\mathrm{Mont}(U_0, U)$.

The first feature of the above algorithm is to change the location of two operands $U_0$ and $U_1$ of $U_{1-di}\mathrm{Mont}(U_0, U_1)$ randomly. This is enough to defend against the second-order CPA (Correlation Power Analysis). Because any dependency between computed values in the previous bit and loaded values in the present bit is eliminated. The second feature of the above algorithm is to change the order of two operations $U_{1-di}=\mathrm{Mont}(U_0, U_1)$ and $U_{di}=\mathrm{Mont}(U_{di}, U_{di})$ randomly.

It is explained the security of the above algorithm as below. As above mentioned, the above algorithm is basically designed to combine the ML method with the message blinding method. Therefore, the above algorithm is secure against SPA, DPA, and RPA.

Furthermore, in the above algorithm, when $d_i=0$, $U_2=\mathrm{Mont}(U_0, U_0)$ and $U_1=\mathrm{Mont}(U_1, U_0)$ for r=0 and $U_2=\mathrm{Mont}(U_0, U_1)$ and $U_0=\mathrm{Mont}(U_0, U_0)$ for r=1. The correlation coefficient for r=0 is higher than that for r=1, because the second operand is same when r=0. Therefore, if we compute correlation coefficients between the first multiplication and the second one, the peak of the correlation coefficient is reduced by half compared with the case of r=0 because of the random decision of r. In the other case, when $d_i=1$, $U_2=\mathrm{Mont}(U_1, U_0)$ and $U_1=\mathrm{Mont}(U_1, U_1)$ for r=0 and $U_2=\mathrm{Mont}(U_1, U_1)$ and $U_0=\mathrm{Mont}(U_0, U_1)$ for r=1. For the same reason when $d_i=0$ the peak of the correlation coefficient is reduced by half compared with when r=1. In conclusion, the peaks are always the same, independent of the secret key bit. Therefore, the above algorithm is secure against SOCPA as well as SPA, DPA, RPA, and SODPA.

And the above algorithm has almost the same computational cost as the BRIP algorithm. Although the above algorithm utilizes additional ROM for z and $z^{-2^n}$, ROM is comparatively sufficient in crypto devices. Both algorithms utilize two exponentiations by v and one main exponentiation using the secret key d. Let t and n be the bit size of v and d. Then the computational cost of the BRIP method is 3tM+2nM+5M, where we assume that the exponentiation by v is computed with a binary method secure against SPA, and M denotes the computational time of a multiplication. The computational cost of our method is 3tM+2nM+4M.

The exponent splitting (ES) $X^r X^{d-r} \bmod m$ utilizes two exponentiations. If it uses the binary method using atomicity then the computational cost is 3nM. In the case of the improved exponent splitting (IES) $(X^r)^{[d/r]} X^{(d \bmod r)} \bmod m$, if it uses the simultaneous method for two exponentiations $(X^r)^{[d/r]} \bmod m$ and $X^{(d \bmod r)} \bmod m$, and the size of a random number r is n/2, then the computation cost is 13/8nM. However, it utilizes the inverse of r which takes large computation time and memory.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:
1. A decryption method, comprising:
receiving a secret key at a circuit; and
repeating a plurality of Montgomery multiplications on a ciphertext until a modular exponentiation of the secret key,
wherein, when the repeated Montgomery multiplications are performed, an order of the plurality of Montgomery multiplications or an order of operands is arbitrarily changed, wherein the plurality of Montgomery multiplications comprise:

a first Montgomery multiplication on a square of one of a first operand and a second operand according to a binary value bit of the secret key; and a second Montgomery multiplication on a product of the first operand and the second operand according to a second binary value bit of the secret key, wherein, before the plurality of Montgomery multiplications are performed, a random bit is used to arbitrarily change the order of the first and second operands.

2. The decryption method of claim 1, further comprising:
blinding the ciphertext after the secret key is received; and
removing the blinding from a final value after the repeated Montgomery multiplications are performed.

3. The decryption method of claim 2, further comprising:
multiplying the ciphertext by a random number for the blinding of the ciphertext; and
multiplying the final value by an inverse element of the random number for the removing of the blinding.

4. The decryption method of claim 1, wherein, before the plurality of Montgomery multiplications are performed, the order of the first and second Montgomery multiplications is determined according to the generated random bit, and the order of the first and second operands is determined the generated random bit.

5. The decryption method of claim 1, wherein the first Montgomery multiplication comprises a Montgomery multiplication of an operand corresponding to the binary value bit of the secret key and an operand corresponding to the generated random bit.

6. The decryption method of claim 5, wherein the second Montgomery multiplication comprises a Montgomery multiplication of an operand corresponding to a bit opposite to the generated random bit and an operand corresponding to the second binary value bit of the secret key.

7. The decryption method of claim 6, wherein the first Montgomery multiplication produces a result value that becomes an operand corresponding to the random bit.

8. The decryption method of claim 1, wherein, when the ciphertext is 1 or −1, a certain value becomes an output value of an encryption method.

9. An encryption circuit comprising:
an encryption unit encrypting a plaintext using an encryption key according to an encryption process; and
a decryption unit decrypting a ciphertext using a decryption key according to the encryption process,
wherein the encryption process repeats a plurality of Montgomery multiplications using first and second operands according to a binary value bit of the encryption key on the ciphertext until a modular exponentiation of the encryption key, or repeats a plurality of Montgomery multiplications using the first and second operands according to a binary value bit of the decryption key on the plaintext until a modular exponentiation of the decryption key, and an order of the first and second operands is arbitrarily changed using a random bit.

10. A decryption unit comprising:
a shift register receiving a secret key comprising a plurality of bits and sequentially outputting the plurality of binary value bits of the secret key;
a random generator generating a first random number for blinding and a second random number for arbitrarily changing an order of Montgomery multiplications and an order of operands;

an exponentiation operator performing a modular exponentiation of the first random number on a first fixed value and a second fixed value that are inputted to blind a ciphertext, respectively, the second fixed value being an inverse element of $2^m$ modular exponentiated value of the first fixed value;

a first operand register storing a first operand, the first operand having an initial value being a result value of a Montgomery multiplication of the first fixed value and a square of a radix;

a second operand register storing a second operand, the second operand having an initial value being a result value of a Montgomery multiplication of the initial value of the first operand and a result value of Montgomery multiplication of the ciphertext and the square of the radix;

a third operand register storing the second fixed value for removing the blinding of the ciphertext; and a Montgomery multiplier performing a plurality of Montgomery multiplications using the first and second operands according to a binary value bit outputted from the shift register, the first and second operands being changed upon the plurality of Montgomery multiplications, and the order of the Montgomery multiplications or the order of the first and second operands being changed according to the second random number when the Montgomery multiplications are performed.

11. The decryption unit of claim 10, further comprising a message checker generating a certain value as an output value of the decryption unit when the ciphertext is 1 or −1.

12. The decryption unit of claim 11, wherein the message checker outputs 1 when the ciphertext is 1, and outputs a value obtained by subtracting two times of a least significant bit of the secret key from 1 when the ciphertext is −1.

13. The decryption unit of claim 10, further comprising a non-volatile memory device storing the first and second fixed values.

14. The decryption unit of claim 10, wherein the Montgomery multiplier performs a first Montgomery multiplication on a square of one of the first operand and the second operand according to a binary value bit of the secret key, regarding each of the plurality of the binary value bits of the secret key, and a second Montgomery multiplication on a product of the first operand and the second operand according to a second binary bit of the secret key, and a result value of the first Montgomery multiplication becomes an operand corresponding to the binary value bit of the secret key.

15. The decryption unit of claim 14, wherein the Montgomery multiplier generates the output value of the decryption unit, by performing a Montgomery multiplication on a finally stored value in the first operand register and the second fixed value stored in the third operand register.

16. The decryption unit of claim 14, wherein the first random number comprises a plurality of a binary value bits.

17. The decryption unit of claim 10, wherein the number of the binary value bits of the secret key is a size of a modulus.

18. The decryption unit of claim 17, wherein the modulus is a product of different prime number having sizes similar to each other.

* * * * *